(12) United States Patent
Webster et al.

(10) Patent No.: US 7,643,081 B2
(45) Date of Patent: Jan. 5, 2010

(54) DIGITAL CAMERA MODULE WITH SMALL SIZED IMAGE SENSOR CHIP PACKAGE

(75) Inventors: Steven Webster, Miao-li (TW); Ying-Cheng Wu, Miao-li (TW); Po-Chih Hsu, Miao-li (TW); Kun-Hsieh Liu, Miao-li (TW)

(73) Assignee: Altus Technology Inc., Chu-Nan, Miao-Li Hsien (TW)

( * ) Notice: Subject to any disclaimer, the term of this patent is extended or adjusted under 35 U.S.C. 154(b) by 525 days.

(21) Appl. No.: 11/402,467

(22) Filed: Apr. 12, 2006

(65) Prior Publication Data

US 2006/0290802 A1 Dec. 28, 2006

(30) Foreign Application Priority Data

Jun. 24, 2005 (CN) ......................... 2005 1 0035554

(51) Int. Cl.
*H04N 5/225* (2006.01)
(52) U.S. Cl. ....................................... 348/340; 348/374
(58) Field of Classification Search ......... 348/373–376, 348/335–340; 250/239
See application file for complete search history.

(56) References Cited

U.S. PATENT DOCUMENTS

| 2002/0089176 | A1* | 7/2002 | Iwasaki ........................ 285/92 |
| 2003/0124773 | A1* | 7/2003 | Hashimoto ................... 438/127 |
| 2004/0113048 | A1* | 6/2004 | Tu ............................ 250/208.1 |
| 2005/0063033 | A1 | 3/2005 | Kinsman | |

FOREIGN PATENT DOCUMENTS

CN 2665733 Y 12/2004

* cited by examiner

*Primary Examiner*—Jason Chan
*Assistant Examiner*—Yih-Sien Kao
(74) *Attorney, Agent, or Firm*—Zhigang Ma

(57) ABSTRACT

A digital camera module (200) includes a lens holder (20), a lens module (30) received in the lens holder, and an image sensor chip package (40) mounted to the lens holder. The lens module includes a lens barrel (301) movably engaged in the lens holder and at least one lens (302) received in the lens barrel. The image sensor chip package includes a base (401), an image sensor chip (402) mounted on the base, a transparent cover (405), and an adhesive (50) positioning the transparent cover with respect to the image sensor chip. The adhesive and the transparent cover cooperatively seal the image sensor chip therein.

3 Claims, 3 Drawing Sheets

DIGITAL CAMERA MODULE WITH SMALL SIZED IMAGE SENSOR CHIP PACKAGE

BACKGROUND OF THE INVENTION

1. Field of the Invention

The present invention generally relates to digital camera modules, and more particularly to a digital camera module with a small sized image sensor chip package which is used in portable electronic devices such as mobile phones, palm-top computers, personal digital assistants (PDAs) and so on.

2. Discussion of the Related Art

Generally, digital cameras are image recording media capable of photographing a plurality of still images without using film. Such a digital camera typically uses an image pickup device, which is a kind of semiconductor device, such as a charge coupled device (CCD) or complementary metal oxide semiconductor (CMOS). In the digital camera, an object image formed on the image pickup device through a lens is converted into an electrical signal by the image pickup device, and the electrical signal is stored as a digital signal in a mobile phone or PDA in which the digital camera is mounted.

A typical digital camera module 100 is illustrated in FIG. 1. The digital camera module 100 is constructed to include a holder 11, a lens module 12 and an image sensor chip package 13. The lens module 12 includes a barrel 121, a lens 122, an IR (infra-red) cut filter 123 and a cover 124. The barrel 121 is placed in and threadingly engaged with the holder 11. The lens 122 is received in the barrel 121. The cover 124 is fixed to the barrel 121, on a front end of the barrel 121 which is exposed to outside. The cover 124 has a transparent area 125 which transmits light from outside to the lens 122. The IR-cut filter 123 is fixed to the barrel 121, opposite to the cover 124. The image sensor chip package 13 includes a bottom layer 131, a frame layer 132, an image sensor chip 133, a plurality of wires 134 and a transparent board 135. The bottom layer 131, which is made of printed circuit board (PCB), includes a plurality of top pads 1311 on a top surface thereof and a plurality of bottom pads 1312 on a bottom surface thereof. Each top pad 1311 corresponds and connects to a respective bottom pad 1312. The frame layer 132 is mounted on the top surface of the bottom layer 131, containing the top pads 1311 therein. The image sensor chip 133 is located on the top surface of the bottom layer 131, surrounded by the top pads 1311. The image sensor chip 133 includes a plurality of chip pads 1331 provided on a top surface thereof. Each chip pad 1331 is electrically connected with a corresponding top pad 1311 via a respective wire 134. The transparent board 135 is secured to the top of the frame layer 132. The image sensor chip package 13 is fixed to the holder 11, with the image sensor chip 133 facing the lens module 12.

In the digital camera module 100, the top surface of the bottom layer 131 peripherally surrounded by the frame layer 132 must contain the top pads 1311 and the image sensor chip 133 together, and sufficient space should be provided between the image sensor chip 133 and an inside wall of the frame 102 for movement of wire bonding tools used to connect the wires 134 with the chip pads 1331 and the top pads 1311. Therefore, package volume for packaging the chip 12 is a lot larger than that taken up by the chip 12, which results in a relative larger volume of the digital camera module 100. As such, the digital camera module 100 is not suitable for slim, compact electronic products.

What is needed, therefore, is a digital camera module with small size, high reliability and high image quality.

SUMMARY OF THE INVENTION

In one embodiment thereof, a digital camera module includes a lens holder, a lens module received in the lens holder, and an image sensor chip package mounted to the lens holder. The lens module includes a lens barrel movably engaged in the lens holder and at least one lens received in the lens barrel. The image sensor chip package includes a base, an image sensor chip mounted on the base, a transparent cover, and an adhesive positioning the transparent cover with respect to the image sensor chip. The adhesive and the transparent cover cooperatively seal the image sensor chip therein.

Other advantages and novel features will become more apparent from the following detailed description when taken in conjunction with the accompanying drawings.

BRIEF DESCRIPTION OF THE DRAWINGS

Many aspects of the present digital camera module can be better understood with reference to the following drawings. The components in the drawings are not necessarily drawn to scale, the emphasis instead being placed upon clearly illustrating the principles of the digital camera module. Moreover, in the drawings, like reference numerals designate corresponding parts throughout the several views.

DETAILED DESCRIPTION OF THE PREFERRED EMBODIMENTS

Figure 1:
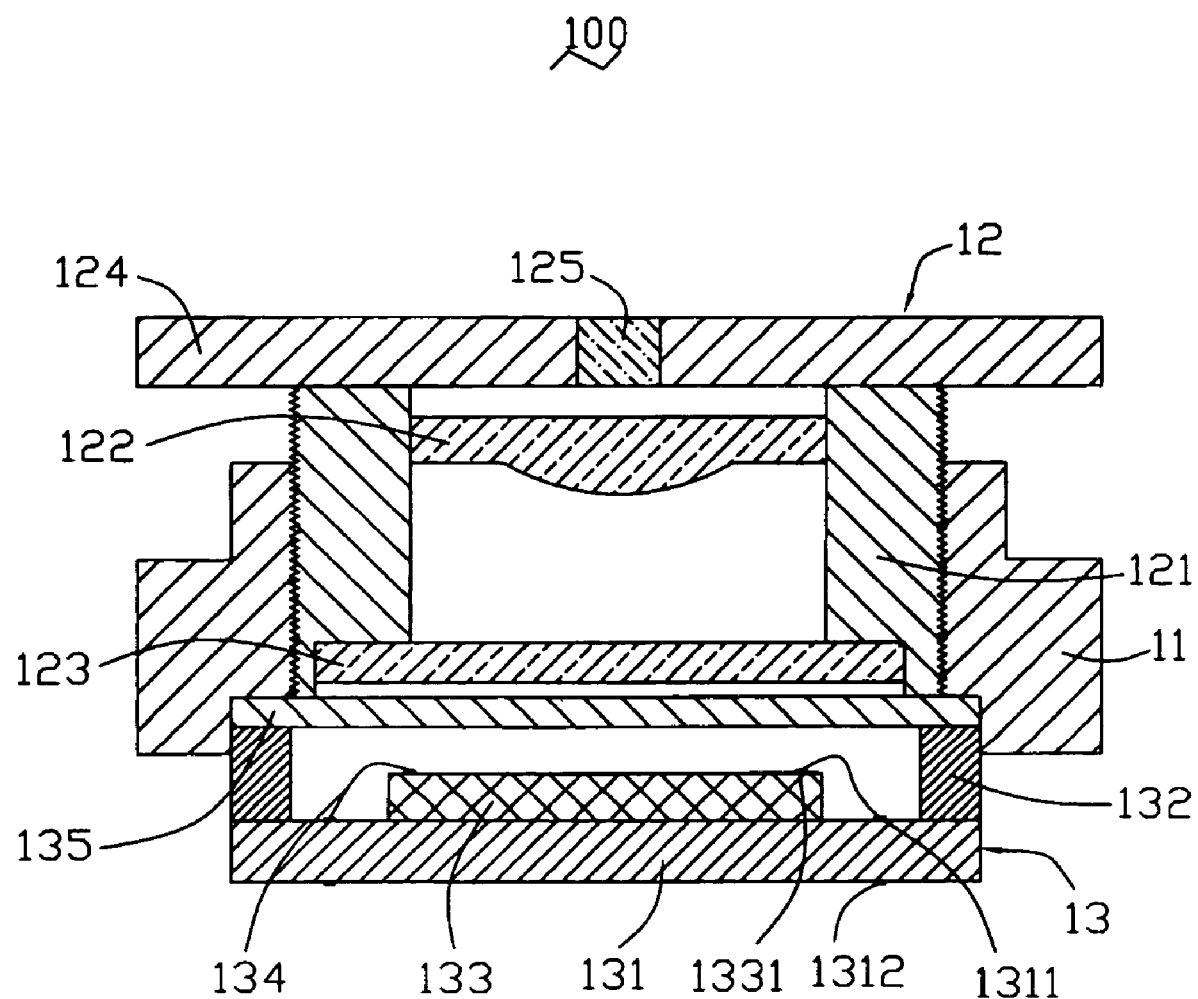
FIG. 1 is a schematic, cross-sectional view of a typical digital camera module.
Figure 2:
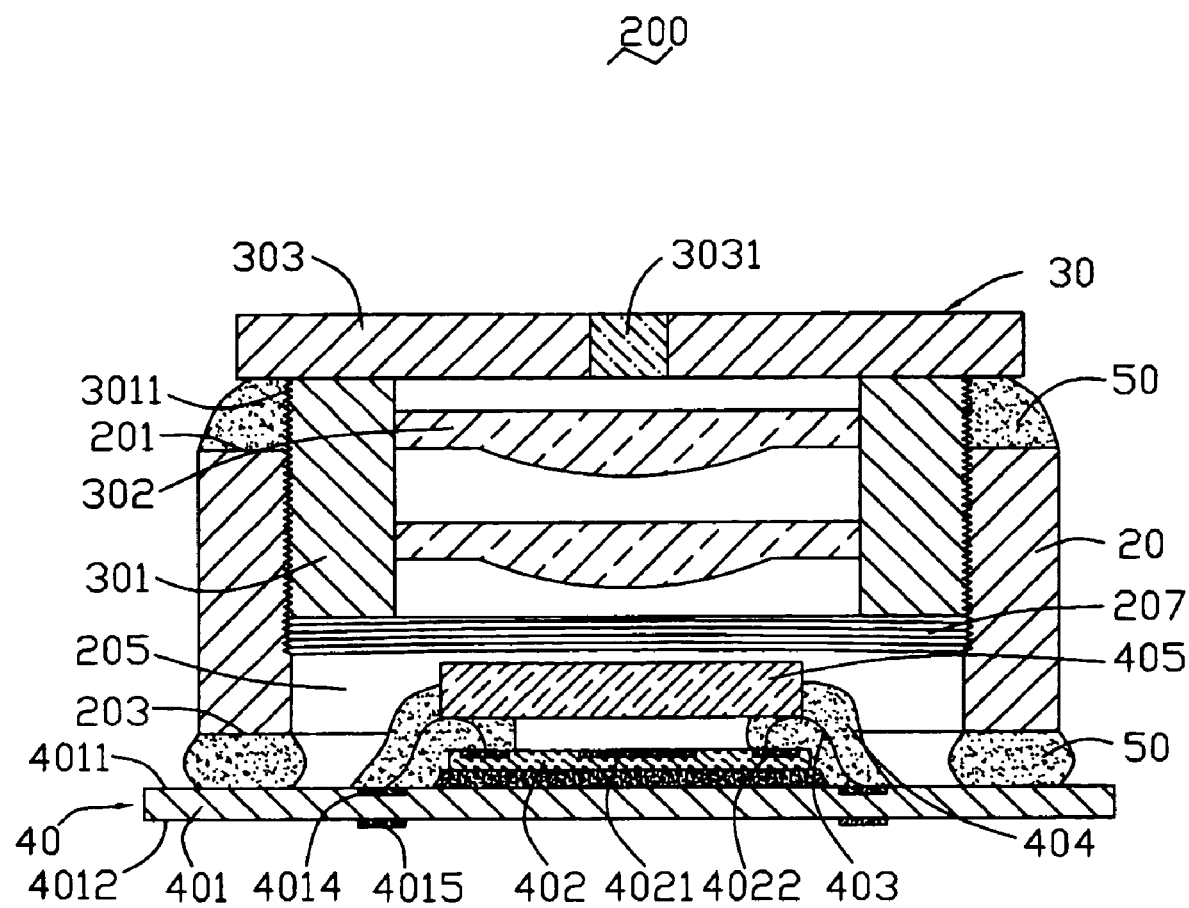
FIG. 2 is a schematic, cross-sectional view of a digital camera module according to a first embodiment of the present invention.

Referring to FIG. 2, a digital camera module 200 in accordance with a first embodiment of the present invention is shown. The digital camera module 200 includes a lens holder 20, a lens module 30 and an image sensor chip package 40 both mounted on the lens holder 20.

The lens holder 20 has a front end 201, a rear end 203 opposite to the front end 201, and a receiving cavity 205 penetrating through the lens holder 20 from the front end 201 to the rear end 203. An internal thread 207 is formed on an inner periphery surface the lens holder 20.

The lens module 30 includes a barrel 301 and at least one lens 302. The barrel 301 is a hollow cylinder for receiving the at least one lens 302 therein, and has an external thread 3011 formed on an external surface thereof. One end of the barrel 301 is covered by a plate 303 which has a transparent region 3031 formed in a central portion thereof. The transparent region 3031 aligns with an optical axis of the lens 302 allowing light to be transmitted to the lens 302.

The image sensor chip package 40 includes a base 401, an image sensor chip 402, a plurality of wires 403, an adhesive means 404 and a transparent cover 405.

The base 401 is made of a material such as a plastic, a ceramic or a fibrous composite. The base 401 has a top surface 4011, a bottom surface 4012 on an opposite side of the base 401 to the top surface 4011, a plurality of top pads 4014 and a plurality of bottom pads 4015. The top pads 4014 are arranged in a circular pattern on the top surface 4011 of the base 401. The bottom pads 4015 are arranged in a circular pattern on the bottom surface 4012. Each bottom pad 4015 corresponds to and electrically connects with a respective top pad 4014. It is to be understood that the top pads 4014 could also be embedded in the base 401 as shown in FIG. 2, with a surface exposed to outside from the top surface 4011, and the bottom pads 4015 also could be embedded in the base 401 with a surface exposed to outside from the bottom surface 4012. The bottom pads 4015 are used to electrically connect with other electronic elements such as a PCB.

The image sensor chip 402 is adhered to the top surface 4011 of the base 401, surrounded by the top pads 4014. A top side of the image sensor chip 402 is arranged with a photosensitive area 4021 and a plurality of chip pads 4022 around the photosensitive area 4021.

The wires 403 are made of a conductive material such as gold or aluminum alloy. One end of each wire 403 is connected/joined with a respective chip pad 4022 of the image sensor chip 402, and the other end of the wire 403 is connected/joined with a respective top pad 4014 of the base 401.

The adhesive means 404, such as a silicone, epoxy, acrylic, or polyamide adhesive, is applied peripherally around the image sensor chip 402, over the wires 403. The adhesive means 404 covers the wires 403 and junctions of the wires 403 and the pads 4014, 4022, in order to protect the wires 403 from crack from metal fatigue and to ensure the connections between the ends of the wires 403 and pads 4014, 4022. It is to be understood that the adhesive means 26 could be applied to the peripheral edge of the image sensor chip 402, over the wires 403, therefore the adhesive means 404 covers part of each wire 403 and junctions between the wires 403 and the chip pads 4022.

The cover 405 is laid over the image sensor chip 402 which receives light transmitted through the cover 405. A bottom surface of the cover 405 touches the top of each wire 403, thereby being supported by the wires 403. The cover 405 is adhered to the adhesive means 404 and therefore seals the photosensitive area 4021 of the image sensor chip 402 together with the adhesive means 404.

In assembling the digital camera module 200, firstly, an adhesive means 50 such as glue is applied on the rear end 203 of the lens holder 20. Secondly, the lens holder 20 with the adhesive means 50 is located on the base 401 of the image sensor chip package 40, with the rear end 203 of lens holder 20 adhered to the top surface 4011 of the base 401 and containing the top pads 4014 of the base 401 therein. Thereafter, the adhesive means 50 is cured to fix the lens holder 20 to the image sensor chip package 40. Thirdly, the lens module 30 is inserted into the receiving cavity 205 of the lens holder 20 from the front end 201 of the lens holder 20, with the lens barrel 301 threadingly engaging with the lens holder 20, then the lens module 30 is adjusted until it is properly focused on the image sensor chip 402. Lastly, the adhesive means 50 is applied to the front end 201 of the lens holder 20 and cured peripherally around the outside surface of the lens barrel 301 exposed to outside from the front end 201 of the lens holder 20, so as to secure the lens barrel 301 to the lens holder 20.

It is to be understood that the lens holder 20 and image sensor chip package 40 could be connected to each other via other connecting assembly such as guiding holes (not shown) and guiding poles (not shown) corresponding to the guiding holes. For example, a plurality guiding holes could be defined in the rear end 203 of the lens holder 20. Accordingly, a plurality guiding of poles would be disposed on the top surface 4011 of base 401 of the image sensor chip package 40, respectively inserted in and engaging with a corresponding guiding hole. The adhesive means 50 would be applied on the top surface 4011 of the base 401, around the periphery of the lens holder 20, in order to enforce the connection between the lens holder 20 and the base 401 of the image sensor chip package 40.

Figure 3:
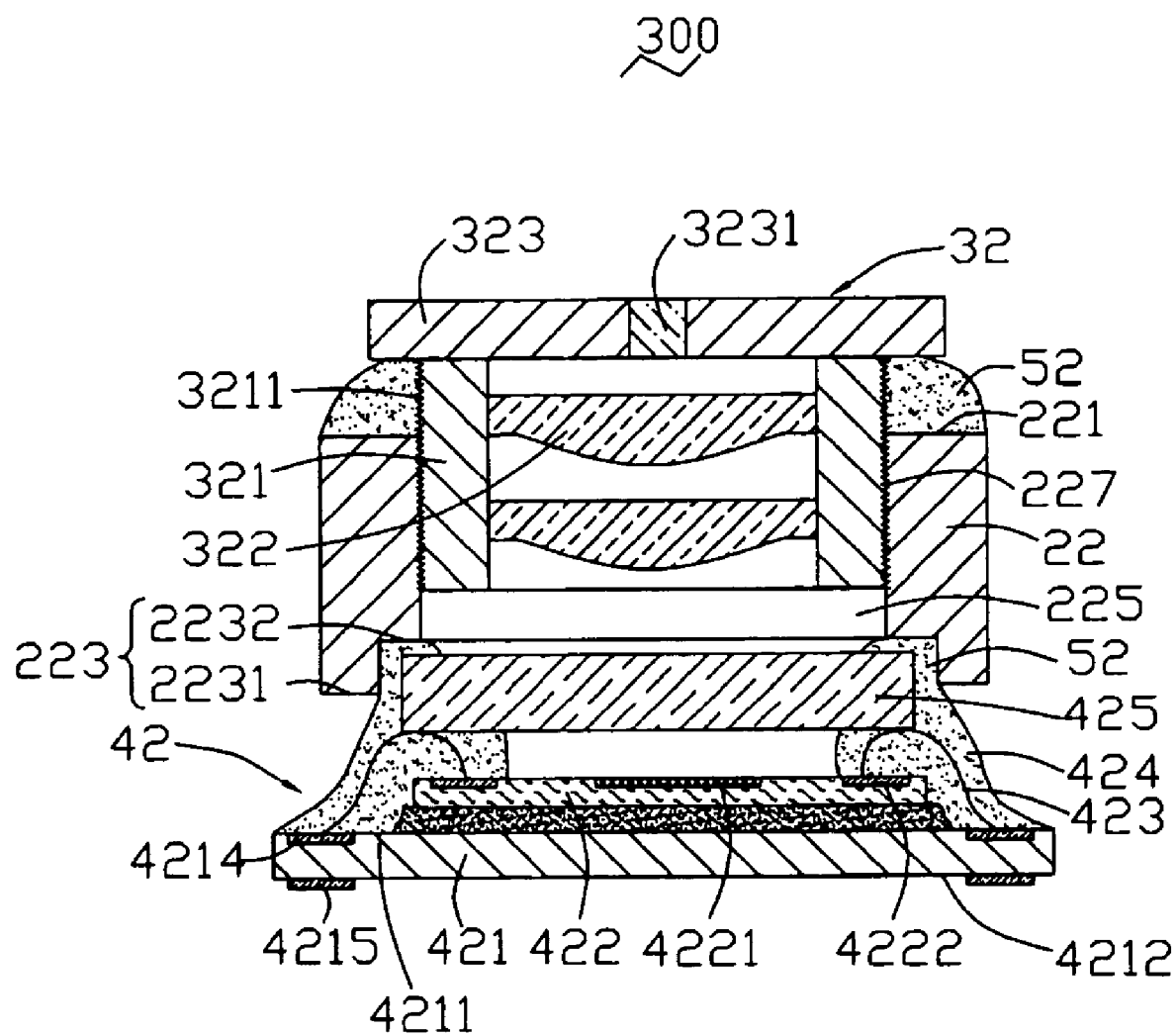
FIG. 3 is a schematic, cross-sectional view of a digital camera module according to a second embodiment of the present invention.

In a second embodiment of the present invention as shown in FIG. 3, a digital camera module 300 has a similar structure to the digital camera module 200. The digital camera module 300 includes a lens holder 22, a lens module 32 and an image sensor chip package 42. The lens holder 22 includes a front end 221, a rear end 223, a hole 225 and an internal thread 227. The lens module 32 is configured to have a lens barrel 321 having an external thread 3211, at least one lens 322 and a plate 323 having a transparent region 3231 formed at a central portion of the plate 323. The image sensor chip package 42 includes a base 421 having a top surface 4211, a bottom surface 4212, a plurality of top pads 4214 and a plurality of bottom pads 4215, an image sensor chip 422 including a photosensitive area 4221 and a plurality of chip pads 4222, a plurality of wires 423, an adhesive means 424 and a transparent board 425.

The difference between the image sensor chip package 300 and the image sensor chip package 200 is that the rear end 223 of the lens holder 22 has a stepped shape including a first step surface 2231 and a second step surface 2232. An inner periphery of the first step surface 2231 has a dimension slightly larger than that of the outer periphery of the cover 425. An inner periphery of the second step portion 2232 has a dimension smaller than that of the outer periphery of the cover 425. The second step surface 2232 of the lens holder 22 connects with the periphery of the cover 425, via an adhesive means 52, so that the lens holder 22 is secured to the image sensor chip package 42.

In the present invention, the image sensor chip is adhered on the top surface of the base without a side wall, thus there is no space restriction on the wire bonding tools' movements. Accordingly, the size of the base can be sufficiently minimized to a size approaching that of the image sensor chip, and the volume of the image sensor chip package can also be minimized which results in a relatively smaller volume for the digital camera module. In addition, the photosensitive area of the image sensor chip is sealed by the adhesive means and the cover. Since the adhesive means and the cover together form a space therebetween which is relatively small to contain relatively little dust and particles therein, the pollution and/or contamination of the photosensitive area is reduced and the quality and reliability of the digital camera module is much improved.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A digital camera module, comprising:
a lens holder having a stepped shaped rear end comprising a first step surface and a second step a lens module received in the lens holder, the lens module comprising a lens barrel movably engaged in the lens holder and at least one lens received in the lens barrel; and
an image sensor chip package mounted to the lens holder, the image sensor chip package comprising a base, an image sensor chip mounted on the base, a transparent cover, and an adhesive positioning the transparent cover with respect to the image sensor chip, the adhesive and the transparent cover cooperatively sealing the image sensor chip therein, an inner periphery of the first step surface having a dimension larger than that of the outer periphery of the transparent cover and an inner periphery of the second step surface having a dimension slightly smaller than that of the outer periphery of the cover, wherein the second step surface of the lens holder connects with a periphery of a top side of the cover via the adhesive means.

2. A digital camera module, comprising:

a lens holder in a shape of a hollow cylinder, the lens holder having a stepped shaped rear end comprising a first step surface and a second step surface;

a lens module received in the lens holder, comprising a lens barrel and at least one lens received in the lens barrel; and an image sensor chip package mounted to the lens holder, comprising:

a base comprising a top surface and a plurality of top pads arranged on the top surface;

an image sensor chip mounted on the top surface of the base, the image sensor chip comprising a photosensitive area configured for receiving light transmitted through the lens module, and a plurality of chip pads around the photosensitive area;

a plurality of wires each electrically connecting one of the chip pads of the image sensor chip with a corresponding one of the top pads of the base;

an adhesive means applied on peripheral edge of the image sensor chip, over the wires, the adhesive means covering areas where the wires connect with the chip pads; and a transparent cover mounted to the image sensor chip via the adhesive means, the cover together with the adhesive means sealing the photosensitive area of the image sensor chip, an inner periphery of the first step surface having a dimension larger than that of the outer periphery of the cover, and an inner periphery of the second step surface having a dimension slightly smaller than that of the outer periphery of the cover, wherein the second step surface of the lens holder connects with a periphery of a top side of the cover via the adhesive means.

3. A digital camera module, comprising:

a lens holder in a shape of a hollow cylinder, the lens holder having a stepped shaped rear end comprising a first step surface and a second step surface;

a lens module received in the lens holder, comprising a lens barrel and at least one lens received in the lens barrel; and an image sensor chip package mounted to the lens holder, comprising:

a base comprising a top surface and a plurality of top pads arranged on the top surface;

an image sensor chip mounted on the top surface of the base, the image sensor chip comprising a photosensitive area configured for receiving light transmitted through the lens module, and a plurality of chip pads around the photosensitive area;

a plurality of wires each electrically connecting one of the chip pads of the image sensor chip with a corresponding one of the top pads of the base;

an adhesive means applied on peripheral edge of the image sensor chip, over the wires, the adhesive means covering areas where the wires connect with the chip pads; and a transparent cover mounted to the image sensor chip via the adhesive means, the cover together with the adhesive means sealing the photosensitive area of the image sensor chip, an inner periphery of the first step surface having a dimension larger than that of the outer periphery of the cover, and an inner periphery of the second step surface having a dimension slightly smaller than that of the outer periphery of the cover, wherein, the cover comprises a bottom surface touching the top of each wire.

* * * * *

UNITED STATES PATENT AND TRADEMARK OFFICE
CERTIFICATE OF CORRECTION

| | | |
|---|---|---|
| PATENT NO. | : 7,643,081 B2 | Page 1 of 1 |
| APPLICATION NO. | : 11/402467 | |
| DATED | : January 5, 2010 | |
| INVENTOR(S) | : Webster et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 793 days.

Signed and Sealed this

Sixteenth Day of November, 2010

David J. Kappos
*Director of the United States Patent and Trademark Office*